(12) United States Patent
Fahim et al.

(10) Patent No.: US 11,281,562 B2
(45) Date of Patent: *Mar. 22, 2022

(54) METHOD AND SYSTEM FOR CACHE AGENT TRACE AND CAPTURE

(71) Applicant: Intel Corporation, Santa Clara, CA (US)

(72) Inventors: Bahaa Fahim, Santa Clara, CA (US); Swadesh Choudhary, Mountain View, CA (US)

(73) Assignee: INTEL CORPORATION, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/721,868

(22) Filed: Dec. 19, 2019

(65) Prior Publication Data

US 2020/0210315 A1 Jul. 2, 2020

Related U.S. Application Data

(63) Continuation of application No. 15/639,294, filed on Jun. 30, 2017, now Pat. No. 10,534,687.

(51) Int. Cl.
*G06F 11/30* (2006.01)
*G06F 11/34* (2006.01)
(Continued)

(52) U.S. Cl.
CPC ...... *G06F 11/3485* (2013.01); *G06F 11/1446* (2013.01); *G06F 11/349* (2013.01); *G06F 11/3636* (2013.01); *G06F 11/079* (2013.01); *G06F 11/3037* (2013.01); *G06F 11/3461* (2013.01); *G06F 2201/84* (2013.01); *G06F 2201/86* (2013.01); *G06F 2201/885* (2013.01)

(58) Field of Classification Search
CPC ......................... G06F 11/3037; G06F 11/3485
USPC ..................................................... 714/6.1, 45
See application file for complete search history.

(56) References Cited

U.S. PATENT DOCUMENTS 5,894,575 A * 4/1999 Levine ................ G06F 11/3636
717/128
7,356,652 B1 * 4/2008 Dew ..................... G06F 11/349
711/141

(Continued)

OTHER PUBLICATIONS

Intel Corporation, "Intel 64 and IA-32 Architectures Software Developer's Manual, vol. 3B: System Programming Guide, Part 2", Chapter 17, Order No. 253669-060US, Sep. 2016, 64 pages.

(Continued)

*Primary Examiner* — Chae M Ko
(74) *Attorney, Agent, or Firm* — Nicholson De Vos Webster & Elliott LLP

(57) ABSTRACT

In one embodiment, a processor comprises a fabric interconnect to couple a first cache agent to at least one of a memory controller or an input/output (I/O) controller; and a first cache agent comprising a cache controller coupled to a cache; and a trace and capture engine to periodically capture a snapshot of state information associated with the first cache agent; trace events to occur at the first cache agent in between captured snapshots; and send the captured snapshots and traced events via the fabric interconnect to the memory controller or I/O controller for storage at a system memory or storage device.

12 Claims, 15 Drawing Sheets

(51) Int. Cl.
*G06F 11/14* (2006.01)
*G06F 11/36* (2006.01)
G06F 11/07 (2006.01)

(56) References Cited

U.S. PATENT DOCUMENTS

| | | | | |
|---|---|---|---|---|
| 8,452,756 | B2* | 5/2013 | Anderson | G06F 16/24547 707/719 |
| 2008/0114718 | A1* | 5/2008 | Anderson | G06F 16/217 |
| 2011/0138124 | A1* | 6/2011 | Hill | G06F 11/3471 711/122 |
| 2012/0151263 | A1* | 6/2012 | Rentschler | G06F 11/22 714/30 |
| 2014/0040676 | A1* | 2/2014 | Solihin | G06F 11/1612 714/54 |
| 2015/0113228 | A1* | 4/2015 | Huang | G06F 11/34 711/143 |
| 2019/0138719 | A1* | 5/2019 | Sultana | G06F 21/552 |
| 2019/0236011 | A1* | 8/2019 | Dropps | G06F 12/0811 |

OTHER PUBLICATIONS

Non-Final Office Action, U.S. Appl. No. 15/639,294, dated Apr. 4, 2019, 6 pages.
Notice of Allowance, U.S. Appl. No. 15/639,294, dated Aug. 28, 2019, 9 pages.

* cited by examiner

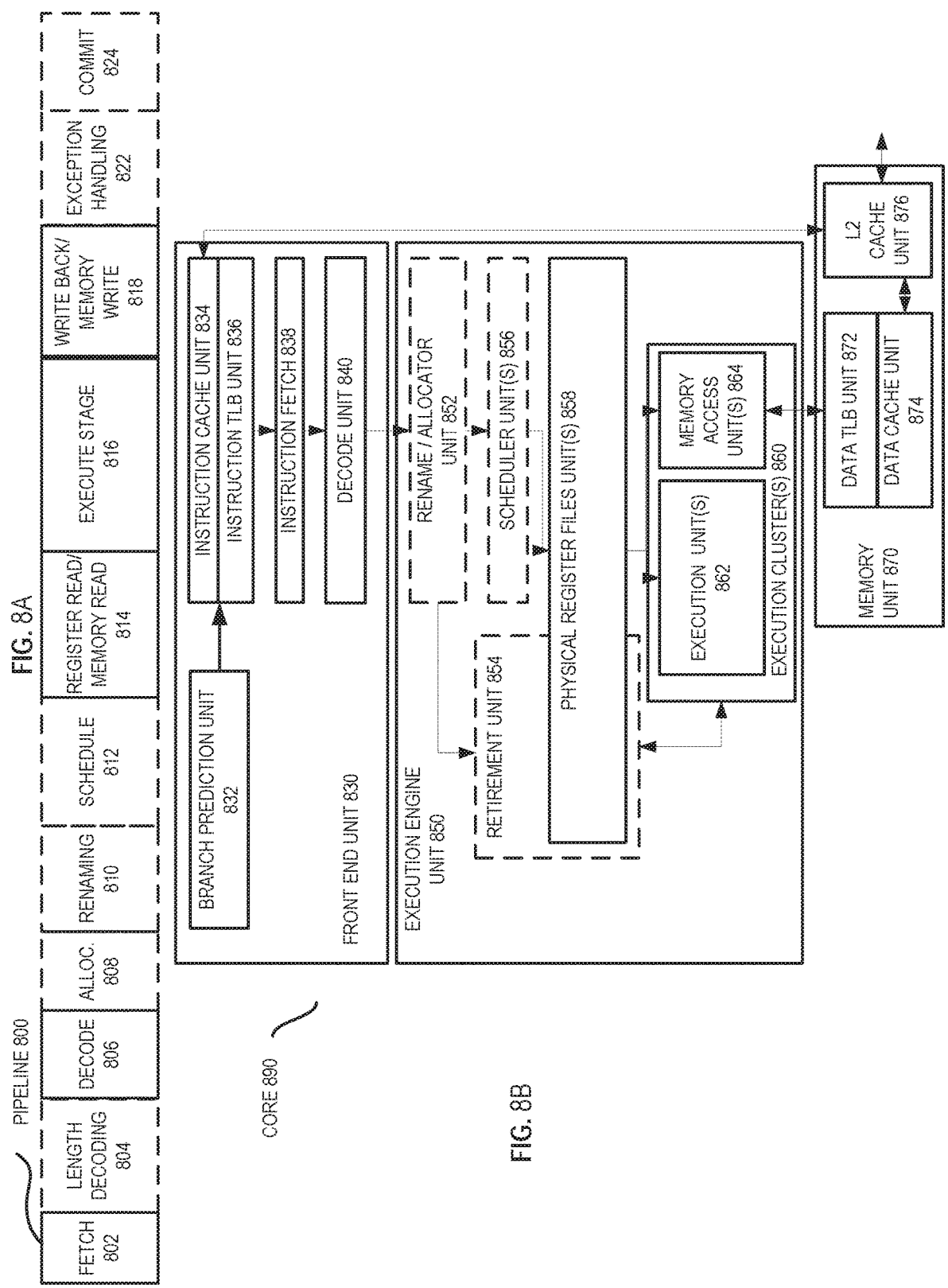

METHOD AND SYSTEM FOR CACHE AGENT TRACE AND CAPTURE

CROSS REFERENCE TO RELATED APPLICATIONS

This application is a continuation of U.S. application Ser. No. 15/639,294, filed Jun. 30, 2017. The disclosure of the prior application is considered part of (and is incorporated by reference in) the disclosure of this application.

FIELD

The present disclosure relates in general to the field of computer development, and more specifically, to computer debugging.

BACKGROUND

A computing system may include one or more processors, one or more memory devices, one or more input/output (I/O) controllers, one or more I/O devices, one or more caches, one or more cache agents, and/or other components. A computing system may undergo a debugging procedure to isolate defects or suboptimal performance issues.

BRIEF DESCRIPTION OF THE DRAWINGS

FIG. 8A is a block diagram illustrating both an exemplary in-order pipeline and an exemplary register renaming, out-of-order issue/execution pipeline in accordance with certain embodiments.

FIG. 8B is a block diagram illustrating both an exemplary embodiment of an in-order architecture core and an exemplary register renaming, out-of-order issue/execution architecture core to be included in a processor in accordance with certain embodiments;

Like reference numbers and designations in the various drawings indicate like elements.

DETAILED DESCRIPTION

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
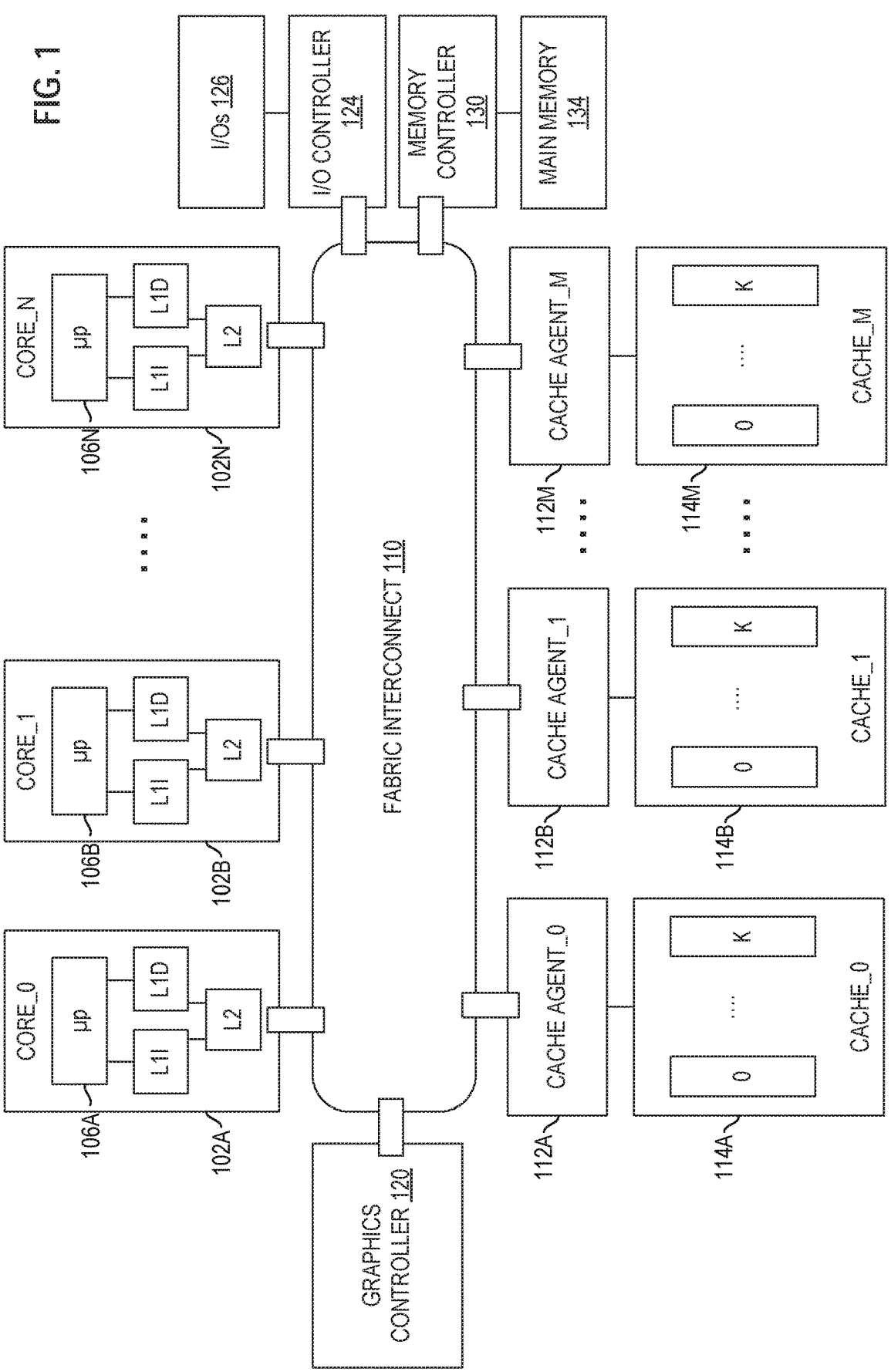
FIG. 1 is a block diagram of a processor with a plurality of cache agents and caches in accordance with certain embodiments.

FIG. 1 is a block diagram of a processor 100 with a plurality of cache agents 112 and caches 114 in accordance with certain embodiments. In a particular embodiment, processor 100 may be a single integrated circuit, though it is not limited thereto. The processor 100 may be part of a system on a chip in various embodiments. The processor 100 may include, for example, one or more cores 102A, 102B . . . 102N. In a particular embodiment, the cores may include a corresponding microprocessor 106A, 106B, or 106N, level one instruction (L1I) cache, level one data cache (L1D), and level two (L2) cache. The processor 100 may further include one or more cache agents 112A, 112B . . . 112M (any of these cache agents may be referred to herein as cache agent 112), and corresponding caches 114A, 114B . . . 114M (any of these caches may be referred to as cache 114). In a particular embodiment, a cache 114 is a last level cache (LLC) slice. An LLC may be made up of any suitable number of LLC slices. Each cache may include one or more banks of memory that corresponds (e.g., duplicates) data stored in system memory 134. The processor 100 may further include a fabric interconnect 110 comprising a communications bus (e.g., a ring or mesh network) through which the various components of the processor 100 connect. In one embodiment, the processor 100 further includes a graphics controller 120, an I/O controller 124, and a memory controller 130. The I/O controller 124 may couple various I/O devices 126 to components of the processor through the fabric interconnect 110. Memory controller 130 manages memory transactions to and from system memory 134.

Post-silicon debug for processors has substantially increased in complexity over previous processor generations. Advances according to Moore's law have resulted in processors being able to host significantly more complex functionality integrated on a single die. This includes significant increases in core count, cache sizes, memory channels, and external interfaces (e.g., chip-to-chip coherent links and I/O links) as well as significantly more advanced reliability, security, and power management algorithms. This increase in microarchitectural complexity has not been matched with corresponding increases in debug observability mechanisms. Accordingly, processor post-silicon durations may be lengthy with sightings of post-silicon system failures and their root causes requiring weeks or months of effort to identify. This problem particularly affects cache agents and other complex logic blocks which host a large number of instances where post-silicon tracing of all instances is not possible due to limitations in chip-level debug bandwidth and advance filtering of a subset of instances is not possible due to a lack of knowledge as to which cache agent instance or cache line is expected to fail, particularly in the absence of full determinism (determinism refers to the reproducibility in time and values of a common outcome based on execution instances having common inputs). Furthermore, the amount of local debug observability required is significant enough that implementing tracing for such logic components is expensive and has a significant impact on chip area and power consumption. Accordingly, post-silicon debug in these areas involves significant expertise and effort to reverse engineer failures and use small pieces of information from focused experiments to develop and confirm a possible theory. This is often expensive and time consuming, thus negatively affecting the design and launch schedule.

In addition, performance debug has been increasing in complexity for processors. Advancements in cloud usage models and applications, with end users preferring to keep their software as private as possible may result in a disconnect between the performance benchmarks used by the processor manufacturer and the actual workloads used by the end users. Debug of performance issues likely to arise under real world conditions is resource intensive (e.g., highly experienced engineers may need to infer customer workload behavior and develop optimizations and/or workarounds to produce acceptable performance results).

Moreover, given transitions towards a full System-On-Chip (SoC) development model for processors (e.g., server processors), the ability to support a larger number of SoCs (including many product derivatives) without increasing the post-silicon sighting root-cause duration is important.

Various embodiments of the present disclosure may provide a Tracing and Capture (TC) engine for a caching agent which allows a deterministic replay of a captured trace for extraction of internal state of processor 100 to assist with functional or performance debug. The TC engine takes periodic snapshots of the state of a caching agent and losslessly records relevant events that occur at the caching agent in between the snapshots. The bandwidth provided by a coherent fabric interconnect 110 (which may provide an external interface to a storage medium to store the captured trace) may allow lossless monitoring of the events associated with the caching agents 112. In various embodiments, the events at each cache agent 112 of a plurality of cache agents of a processor may be traced (as opposed to systems in which a user may only select a subset of one or more instances for tracing which may or may not include the instance in which the failure occurs since the cache agent instances used to perform requests may vary dynamically at runtime). Accordingly, the TC engine may successfully capture debug information without requiring the processor to be globally deterministic.

The processor 100 may be any type of processor, including a general purpose microprocessor, special purpose processor, microcontroller, coprocessor, graphics processor, accelerator, field programmable gate array (FPGA), or other type of processor (e.g., any processor described herein). The processor 100 may include multiple threads and multiple execution cores, in any combination. In one embodiment, the processor 100 is integrated in a single integrated circuit die having multiple hardware functional units (hereafter referred to as a multi-core system). The multi-core system may be a multi-core processor package, but may include other types of functional units in addition to processor cores. Functional hardware units may include processor cores, digital signal processors (DSP), image signal processors (ISP), graphics cores (also referred to as graphics units), voltage regulator (VR) phases, input/output (I/O) interfaces (e.g., serial links, DDR memory channels) and associated controllers, network controllers, fabric controllers, or any combination thereof.

System memory 134 stores instructions and/or data that are to be interpreted, executed, and/or otherwise used by the cores 102A, 102B . . . 102N. The cores may be coupled towards the system memory 134 via the fabric interconnect 110. In some embodiments, the system memory 134 has a dual-inline memory module (DIMM) form factor or other suitable form factor.

The system memory 134 may include any type of volatile and/or non-volatile memory. Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, phase change memory, Spin Hall Effect Magnetic RAM (SHE-MRAM), Spin Transfer Torque Magnetic RAM (STTRAM), or other non-volatile memory devices.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory array is synchronous dynamic random access memory (SDRAM). In some embodiments, any portion of system memory 134 that is volatile memory can comply with JEDEC standards including but not limited to Double Data Rate (DDR) standards, e.g., DDR3, 4, and 5, or Low Power DDR4 (LPDDR4) as well as emerging standards.

A cache (e.g., 114) may include any type of volatile or non-volatile memory, including any of those listed above. Processor 100 is shown as having a multi-level cache architecture. In one embodiment, the cache architecture includes an on-die or on-package L1 and L2 cache and an on-die or on-chip LLC (though in other embodiments the LLC may be off-die or off-chip) which may be shared among the cores 102A, 102B, . . . 102N, where requests from the cores are routed through the fabric interconnect 110 to a particular LLC slice (i.e., a particular cache 114) based on request address. Any number of cache configurations and cache sizes are contemplated. Depending on the architecture, the cache may be a single internal cache located on an integrated circuit or may be multiple levels of internal caches on the integrated circuit. Other embodiments include a combination of both internal and external caches depending on particular embodiments.

During operation, a core 102A, 102B . . . or 102N may send a memory request (read request or write request), via the L1 caches, to the L2 cache (and/or other mid-level cache positioned before the LLC). In one case, a memory controller 112 may intercept a read request from an L1 cache. If the read request hits the L2 cache, the L2 cache returns the data in the cache line that matches a tag lookup. If the read request misses the L2 cache, then the read request is forwarded to the LLC (or the next mid-level cache and eventually to the LLC if the read request misses the mid-level cache(s)). If the read request misses in the LLC, the data is retrieved from system memory 134. In another case, the cache agent 112 may intercept a write request from an L1 cache. If the write request hits the L2 cache after a tag lookup, then the cache agent 112 may perform an in-place write of the data in the cache line. If there is a miss, the cache agent 112 may create a read request to the LLC to bring in the data to the L2 cache. If there is a miss in the LLC, the data is retrieved from system memory 134. Various embodiments contemplate any number of caches and any suitable caching implementations.

A cache agent 112 may be associated with one or more processing elements (e.g., cores 102) and may process memory requests from these processing elements. In various embodiments, a cache agent 112 may also manage coherency between all of its associated processing elements. For example, a cache agent 112 may initiate transactions into coherent memory and may retain copies of data in its own cache structure. A cache agent 112 may also provide copies of coherent memory contents to other cache agents.

In various embodiments, a cache agent 112 may receive a memory request and route the request towards an entity that facilitates performance of the request. For example, if cache agent 112 of a processor receives a memory request specifying a memory address of a memory device (e.g., system memory 134) coupled to the processor, the cache agent 112 may route the request to a memory controller 130 that manages the particular memory device (e.g., in response to a determination that the data is not cached at processor 100. As another example, if the memory request specifies a memory address of a memory device that is on a different processor (but on the same computing node), the cache agent 112 may route the request to an inter-processor communication controller (e.g., controller 504 of FIG. 5) which communicates with the other processors of the node. As yet another example, if the memory request specifies a memory address of a memory device that is located on a different computing node, the cache agent 112 may route the request to a fabric controller (which communicates with other computing nodes via a network fabric such as an Ethernet fabric, an Intel Omni-Path Fabric, an Intel True Scale Fabric, an InfiniBand-based fabric (e.g., Infiniband Enhanced Data Rate fabric), a RapidIO fabric, or other suitable board-to-board or chassis-to-chassis interconnect).

In particular embodiments, the cache agent 112 may include a system address decoder that maps virtual memory addresses and/or physical memory addresses to entities associated with the memory addresses. For example, for a particular memory address (or region of addresses), the system address decoder may include an indication of the entity (e.g., memory device) that stores data at the particular address or an intermediate entity on the path to the entity that stores the data (e.g., a computing node, a processor, a memory controller, an inter-processor communication controller, a fabric controller, or other entity). When a cache agent 112 processes a memory request, it may consult the system address decoder to determine where to send the memory request.

In particular embodiments, a cache agent 112 may be a combined caching agent and home agent, referred to herein in as a caching home agent (CHA). A caching agent may include a cache pipeline and/or other logic that is associated with a corresponding portion of a cache memory, such as a distributed portion (e.g., 114) of a last level cache. Each individual cache agent 112 may interact with a corresponding LLC slice (e.g., cache 114). For example, cache agent 112A interacts with cach 114A, cache agent 112B interacts with cache 114B, and so on. A home agent may include a home agent pipeline and may be configured to protect a given portion of a memory such as a system memory 134 coupled to the processor. To enable communications with such memory, CHAs may be coupled to memory controller 130.

In general, a CHA may serve (via a caching agent) as the local coherence and cache controller and also serve (via a home agent) as a global coherence and memory controller interface. In an embodiment, the CHAs may be part of a distributed design, wherein each of a plurality of distributed CHAs are each associated with one of the cores 102. Although in particular embodiments a cache agent 112 may comprise a cache controller and a home agent, in other embodiments, a cache agent 112 may comprise a cache controller but not a home agent.

I/O controller 124 may include logic for communicating data between processor 100 and I/O devices 126, which may refer to any suitable devices capable of transferring data to and/or receiving data from an electronic system, such as processor 100. For example, an I/O device may be a network fabric controller; an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An I/O device 126 may communicate with I/O controller 124 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various embodiments, I/O devices 126 coupled to the I/O controller 124 may be located off-chip (i.e., not on the same integrated circuit or die as a processor) or may be integrated on the same integrated circuit or die as a processor.

Memory controller 130 is an integrated memory controller (i.e., it is integrated on the same die or integrated circuit as one or more cores 102 of the processor 100) that includes logic to control the flow of data going to and from system memory 134. Memory controller 130 may include logic operable to read from a system memory 134, write to a system memory 134, or to request other operations from a system memory 134. In various embodiments, memory controller 130 may receive write requests originating from cores 102 or I/O controller 124 and may provide data specified in these requests to a system memory 134 for storage therein. Memory controller 130 may also read data from system memory 134 and provide the read data to I/O controller 124 or a core 102. During operation, memory controller 130 may issue commands including one or more addresses (e.g., row and/or column addresses) of the system memory 134 in order to read data from or write data to memory (or to perform other operations). In some embodiments, memory controller 130 may be implemented in a different die or integrated circuit than that of cores 102.

Although not depicted, a computing system including processor 100 may use a battery, renewable energy converter (e.g., solar power or motion-based energy), and/or power supply outlet connector and associated system to receive power, a display to output data provided by processor 100, or a network interface allowing the processor 100 to communicate over a network. In various embodiments, the battery, power supply outlet connector, display, and/or network interface may be communicatively coupled to processor 100.

Figure 2:
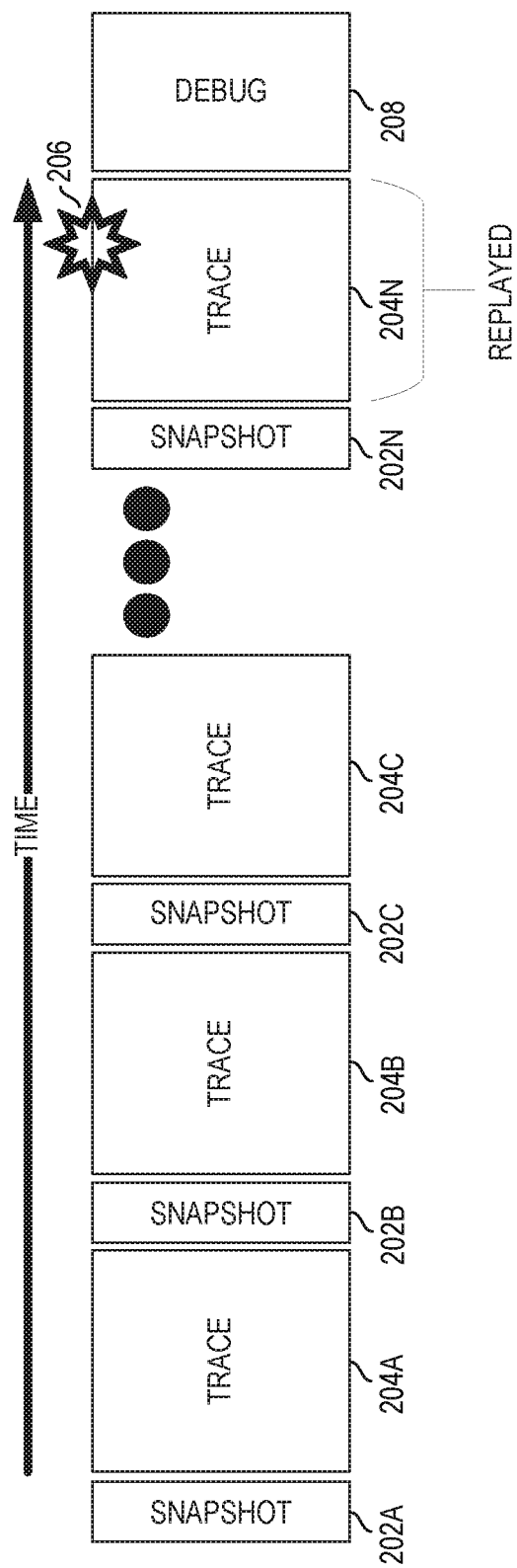
FIG. 2 is a flow for snapshotting state and tracing events at a cache agent in accordance with certain embodiments.

FIG. 2 is a flow for snapshotting state and tracing events at a cache agent 112 in accordance with certain embodiments. Various embodiments of the tracing and capture (TC) mechanism disclosed herein include three phases to extract a deterministic failure trace: snapshot of the state of the cache agent 112 (which may include any suitable state associated with the cache agent 112, such as the contents of the cache 114 coupled to the cache agent 112), tracing events occurring at cache agent 112, and replay of the events on an emulator of a debug platform when a failure occurs. Although the following discussion focuses on a particular cache agent 112, the same actions may be taken at any number of instances of cache agent 112 (e.g., 112A, 112B, 112C, etc.). For example, the snapshot phase may occur simultaneously for each instance of cache agent 112 on the processor. As another example, traces may be recorded for each cache agent instance simultaneously.

The TC mechanism may include taking a periodic snapshot of the state of the cache agent 112, exporting the state into storage, and exporting traced events that occur at the cache agent 112 in between snapshots. In a particular embodiment, the exported state and traced events are stored in an address range in system memory 134 (e.g., DRAM) or memory mapped I/O (e.g., the PCIe address space) reserved by the processor (e.g., via BIOS of the processor 100 at boot time).

In some situations, a failure may take a relatively long time to reproduce. Accordingly, it may not be practical to store a trace from the beginning of execution up to the point of failure. Thus, in various embodiments, a snapshot and subsequent trace (where a trace refers to the events occurring after a snapshot and before the next snapshot) may overwrite the previous snapshot and trace. In a particular embodiment, a periodic trigger to begin a snapshot is configured to occur every X clock cycles through a free running hardware counter which is programmed (e.g., at boot time) with the appropriate trigger duration. In particular embodiments, the hardware counter may be coupled to each cache agent 112 to trigger the snapshot on each of the cache agents 112 at the same time. The duration may be user configurable and/or automatically programmed based on any suitable information, such as an amount of invasiveness to the failure/test content (e.g., the bandwidth used to capture the traced events) or an amount of memory available to store a lossless trace. For example, an upper limit on the duration between snapshots may be set based on how much memory is available to store the snapshot and the trace information and how much storage is expected to be taken up by the trace information per unit of time.

During the snapshot phase 202, a new reference frame is established (e.g., by resetting a timestamp counter). A record of each relevant event that occurs after the snapshot may be stored along with an indication of the time (in relation to the reference frame) at which the event occurred.

During the snapshot phase 202, the processor 100 is also brought to a quiescent state wherein new requests are prevented from being sent to the cache agent 112 and existing requests pending at the cache agent 112 are completed. During the snapshot phase, the cache agent 112 is also put in a clean state (e.g., a state similar to a reset state). This may involve resetting various flow control states (or otherwise causing or allowing the states to move to known states) of the cache agent 112 to move the cache agent 112 towards a deterministic state. As various examples, arbiter states of the cache agent 112 (e.g., logic determining the order in which requests from multiple different buses carrying incoming requests are to be processed), linked list pointers used for request queue management, logic determining when a particular bus may be used by the cache agent 112, or other flow control states may be reset. In various embodiments, a reset signal associated with the snapshot phase is combined (e.g., via an OR gate) with a normal reset signal (e.g., that is used at bootup) and provided to the logic such that the logic may be reset via either signal. In various embodiments, register configuration nodes that are programmed at boot time by BIOS of processor 100 and are static during operation are not reset at the snapshot phase. In various embodiments, values stored in caches associated with the cache agent 112 (e.g., cache 114, a snoop filter, and/or a I/O directory cache) are not reset in the snapshot phase. Putting the cache agent into a clean state may facilitate accurate emulation of the cache agent during the debug phase.

As part of the snapshot phase 202, internal state associated with the cache agent 112 that survives the movement to the quiescent state is captured and read out through an external interface, e.g., via memory controller 130 to system memory 134 or to a storage device via I/O controller 124 (e.g., via a PCIe controller). In various embodiments, the state that is captured includes relevant state values that do not get reset and are not otherwise available independent of the test (e.g., values that are static throughout the test execution may either be captured once rather than at every snapshot and/or may be available through configuration data). Examples of events that are not captured in various embodiments include writes of constants to registers, scan hooks, fuse configurations, or other information that may be known independently of the test execution.

In various embodiments, the internal state that is captured and read out includes one or more caches, such as the last level cache 114 coupled to the cache agent 112, a snoop filter tag cache, or a set of directory caches. These caches are not reset during the snapshot phase, as resetting these values could negatively affect the ability to reproduce encountered failures (e.g., if the values of the cache(s) are reset at each snapshot, the outcome of the test instruction sequence may change). In various embodiments, any other state information associated with the cache agent 112 that is relevant to the debug process, is not reset, and is not more easily determinable in another manner may be read out as well.

Once the snapshot phase 202 is complete, a trace phase 204 is entered. During the trace phase 204, any relevant event associated with the cache agent 212 is captured (and read out to memory or storage in a manner similar to the state capture performed in the snapshot phase) along with a timestamp for each event (where the timestamp may be relative to the time of a known reference frame such as the snapshot immediately preceding the trace phase 204). Any suitable events that may affect and/or be indicative of the internal state of the processor 100 may be traced. For example, requests received at the cache agent 212 (e.g., read requests, write requests, writeback requests, etc.) may be captured. As another example, operations performed by the cache agent 212 (e.g., snoop operations) may be captured. As another example, results (e.g., data retrieved from the cache 214 or other results from corresponding requests) returned by the cache agent 212 may be captured. As another example, events that affect interops or logs of the cache agent 212 may be captured. The captured events and their respective timestamps may be used in conjunction with the information captured during the snapshot phase to reproduce the input stream to the cache agent during debug in the event of a failure occurring during the tracing phase 204. In particular embodiments, the types of events that are captured during the trace phase may be reconfigurable (e.g., via a firmware update).

In various embodiments, the capture of the events is lossless. That is, each event of the relevant types of events are captured over the trace phase 204 (i.e., no events are dropped even if bandwidth to transfer the traced data becomes limited). In particular embodiments, the trace data may be exposed (i.e., sent to a memory or storage device for access by a debugging platform) via a memory or PCIe interface, thus the amount of bandwidth available to export the trace data may be limited at times. When the bandwidth required to transfer the trace data becomes larger than the available bandwidth, the inputs to the cache agent 112 (i.e., the components coupled to the fabric interconnect 110 that send requests to the cache agent 112) may be throttled so that none of the trace data is lost. In various embodiments, the throttling may involve providing flow control of interconnect buffers without introducing deadlock risks. For example, if buffers used to hold the trace data before the data is exported from the cache agent 112 are full or if the interconnect fabric coupled to the cache agent 112 (e.g., fabric interconnect 110) is busy, the TC engine may backpressure or throttle the interconnect fabric to reduce (or stop) inbound traffic in order to ensure that all relevant events are traced with no loss in visibility. Furthermore, to ensure deadlock free tracing, the throttling is performed in a manner that ensures that tracing writes continue to be processed (even when other requests or responses are throttled). In particular embodiments, this may be accomplished by throttling transgress queues or buffers which already exist as part of a coherent fabric implementation and flow control. Accordingly, the throttling mechanism does not introduce any significant additional area or power impact to a baseline micro-architecture.

After the trigger duration (i.e., the amount of time between snapshots) has passed (and assuming that no failures have been encountered), the next snapshot is taken and the captured state overwrites the captured state of the last snapshot. Ensuing events are also traced during a subsequent trace period 204 and are written over stored events from the preceding trace period. For example, the captured state at snapshot 202B and traced events at 204B may overwrite the captured state at snapshot 202A and traced events and 204A.

When a failure is detected during a trace phase 204N at a particular cache agent 112, a debug phase 208 is entered. Any suitable failures may be detected, such as a request that times out, an unexpected output, or other suitable failure. In a particular embodiment, the particular cache agent that experienced the failure may be determined based on a memory address specified in a request associated with the failure (e.g., each cache agent 212 may be responsible for processing requests for a portion of the address space of the system memory). In some embodiments, a failure log from a scan capture may indicate which cache agent(s) 112 experienced the failure.

During the debug phase 208, a pre-silicon emulation-based replay of the failure is performed. Even though the trace capture is often done on many cache agents 112 simultaneously, the replay may be done on only a subset of one or more cache agents associated with a failure (e.g. based on a determination of which instances processed a cacheline or address which encountered a failure).

In a particular embodiment, the emulator used to replay the failure may include logic that implements the functionality of the caching agent. In a particular embodiment, the emulator may also have logic that implements the functionality of a cache 114 (e.g., a single last level cache), logic that implements the functionality of a snoop filter, and logic to convert traced events into inputs into the emulator such that the emulator experiences the same instruction sequence as the actual cache agent 112. In a particular embodiment, the emulator may omit mesh or coherent fabric components. In various embodiments, the emulator may include any suitable logic that performs in a manner that is identical to or at least similar to the logic of the cache agent. In a particular embodiment, the emulator is implemented on an FPGA or other configurable logic.

During debug, the emulator's cache and registers are loaded with the known state values (e.g., the state captured during the snapshot phase 202N and other known state values) at the exact clock offset relative to the snapshot frame cycle. A set of inputs that mirror the traced events are then applied to the emulator (at the corresponding clock offsets based on their timestamps) and the various states of the emulator are observed (any suitable states of the emulated cache agent may be observable at each timestep), facilitating debug of the failure.

In addition to detecting explicit failures, the TC engine may be used to extract sufficient tracing information from customer workloads to enable the reproduction of performance issues (and the determination of the root causes of such performance issues).

Figure 3:
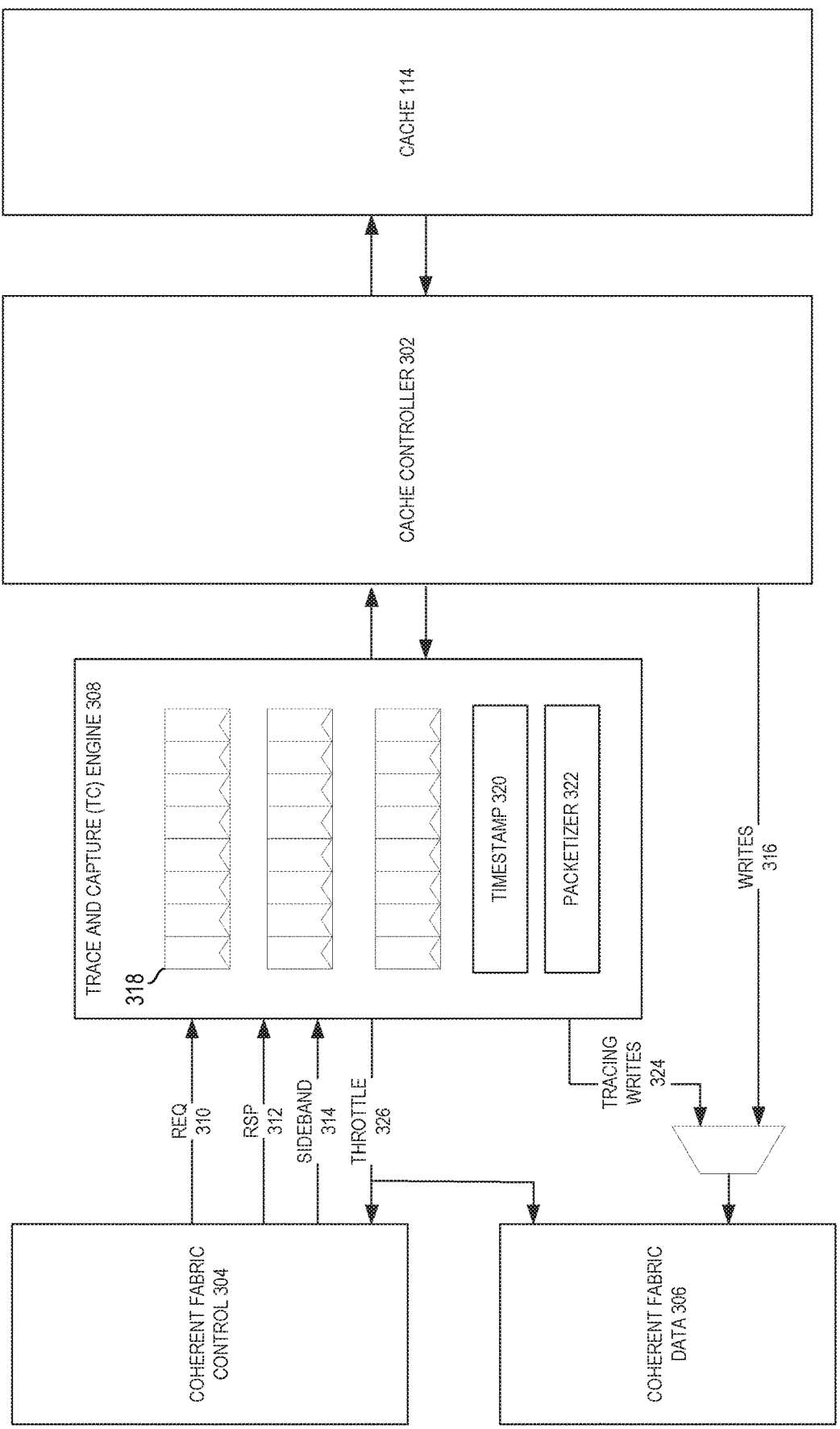
FIG. 3 is a block diagram of a cache agent comprising a trace and capture (TC) engine in accordance with certain embodiments.

FIG. 3 is a block diagram of a cache agent 112 comprising a trace and capture (TC) engine 308 in accordance with certain embodiments. The TC engine 308 may be implemented using any suitable logic. In a particular embodiment, the TC engine 308 may be implemented through firmware executed by a processing element of cache agent 112. The TC engine 308 acts as a tracing buffer between the coherent interconnect fabric 110 (e.g., mesh or ring-based on-die interconnect) and the cache controller 302.

The TC engine 308 buffers (using storage 318) and packetizes (using packetizer 322) all relevant inbound messages and issues tracing writes 324 to a memory range which is specifically reserved for TC (e.g., via the BIOS of processor 100). A tracing write 324 may include a portion of the state of the cache agent 112 captured during a snapshot phase or a record of one or more events captured by the TC engine 308 during a trace phase. In various embodiments, the tracing writes 324 may have a format that is similar to a format of regular writes 316 issued by the cache controller 302 to the system memory 134 or an I/O device 126 and the tracing writes share the same write path that cache controller 302 uses to issue a write to system memory 134 or to I/O devices (e.g., via a PCIe interface). A tracing write is may identify a location in system memory 134 or an I/O space in which to store the trace information. A tracing write may include a description of one or more events and the time that each event occurred (as provided by timestamp logic 320) or a portion of the state of the cache agent 112.

In a particular embodiment, a separate instance of a TC engine 308 may be included within each cache agent 112 and coupled between the coherent fabric interconnect 110 and each cache controller 302 of a processor 100. In another embodiment, a TC engine 308 may be coupled to multiple cache agents 112 and capture state and trace events for each of the cache agents. The processor 100 may include a coherent fabric interconnect 110 (e.g., a ring or mesh interconnect) that connects the cache agents 112 to each other and to other agents which are able to support a relatively large amount of bandwidth (some of which is to be used to communicate traced information to a storage medium), such as at least one I/O controller (e.g., a PCIe controller) and at least one memory controller.

The coherent fabric control interface 304 (which may include any suitable number of interfaces) include request interfaces 310, response interfaces 312, and sideband interfaces 314. Each of these interfaces is coupled to TC engine 308, which traces relevant events on these interfaces. TC engine 308 also passes these events through to cache controller 302.

A throttle signal 326 is sent from the TC engine 308 to flow control logic of the interconnect fabric 110 (and/or components coupled to the interconnect fabric 110) when bandwidth becomes constrained (e.g., when the amount of bandwidth available on the fabric is not enough to handle all of the tracing writes 324). In a particular embodiment, the throttle signal 326 may go to a mesh stop or ring stop which includes a flow control mechanism that allows acceptance or rejection of requests from other agents coupled to the interconnect fabric. In various embodiments, the throttle signal 326 may be the same throttle signal that is used to throttle normal traffic to the cache agent 112 when a receive buffer of the cache agent 112 is full. In a particular embodiment, the sideband interfaces 314 (which may carry any suitable messages such as credits used for communication) are not throttled, but sufficient buffering is provided in the TC engine 308 to ensure that events received on the sideband interface(s) are not lost.

Figure 4:
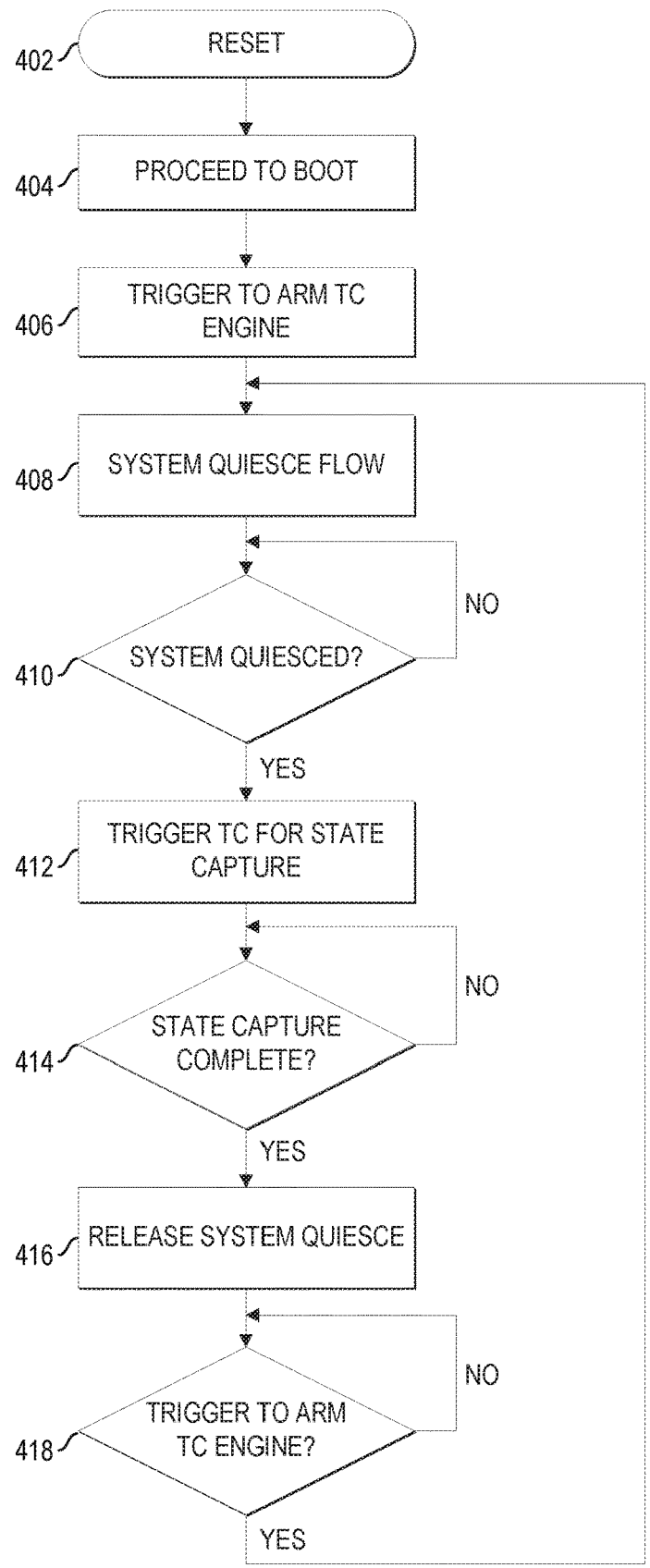
FIG. 4 is a flow for capturing state associated with a cache agent in accordance with certain embodiments.

FIG. 4 is a flow for capturing state associated with a cache agent 112 in accordance with certain embodiments. At 402, the processor (including the cache agent 112) is put into a reset state. At 404, the processor proceeds to boot. At 406, an external trigger is sent to arm the TC engine 308. The sending of the external trigger may be managed using any suitable logic of processor 108 (e.g., a hardware counter or other suitable logic). Once the external trigger is sent, logic of the processor (e.g., microcode or other firmware) issues a system-level quiesce command at 408 to prevent requests from being sent to cache agent 112 (or to all cache agents 112). At 410, a determination is made as to whether the system has reached a quiescent state. If it has not, the system waits for a period of time and then checks again to determine whether the system has reached a quiescent state.

Once the quiescent state has been achieved, the TC engine is triggered for state capture. This may be accomplished in any suitable manner. For example, the firmware or other logic of the processor 100 may write a value to a register of the TC engine 308 to initiate capture of the relevant state. Once the TC 308 has been triggered for state capture, it captures the relevant state of the cache agent 112. For example, TC engine 308 may issue requests (e.g., Cache-Expose requests) to the cache agent 112 to capture the values stored in one or more caches (e.g., cache 114 or a snoop filter cache), packetize the values, and send trace writes with the packetized data to system memory 134 or a storage device. TC engine 308 may then perform capture of the I/O directory cache. In a particular embodiment, TC engine 308 includes a hardware state machine that reads every cache entry and produces the corresponding trace information. In association with the state capture, timestamp logic 320 is reset (e.g., set to zero). Any other state that is to be captured is also exposed via trace writes.

At 414, a determination is made as to whether the state capture is complete. In a particular embodiment, this may include the firmware polling a register of TC engine 308. In a particular embodiment, once the state capture is complete, the TC engine 308 may reset a register of the TC engine 308 (e.g., the same register that was written to when the TC engine 308 was triggered for state capture at 406). Once it is determined that the state capture is complete, the system quiesce is released at 416 and traffic to the cache agent 112 is allowed to resume. The TC engine 308 may enter the trace phase at this point (or upon a determination that the state capture is complete). At 418, if a TC trigger has not been received, the TC engine 308 continues tracing events at the cache controller 112. Once the next trigger is received, the flow returns to 408 and a new snapshot phase is entered.

The flows described in FIGS. 2 and 4 are merely representative of operations that may occur in particular embodiments. In other embodiments, additional operations may be performed. Various embodiments of the present disclosure contemplate any suitable signaling mechanisms for accomplishing the functions described herein. Some of the operations illustrated in FIGS. 2 and 4 may be repeated, combined, modified or omitted where appropriate. Additionally, operations may be performed in any suitable order without departing from the scope of particular embodiments.

Figure 5:
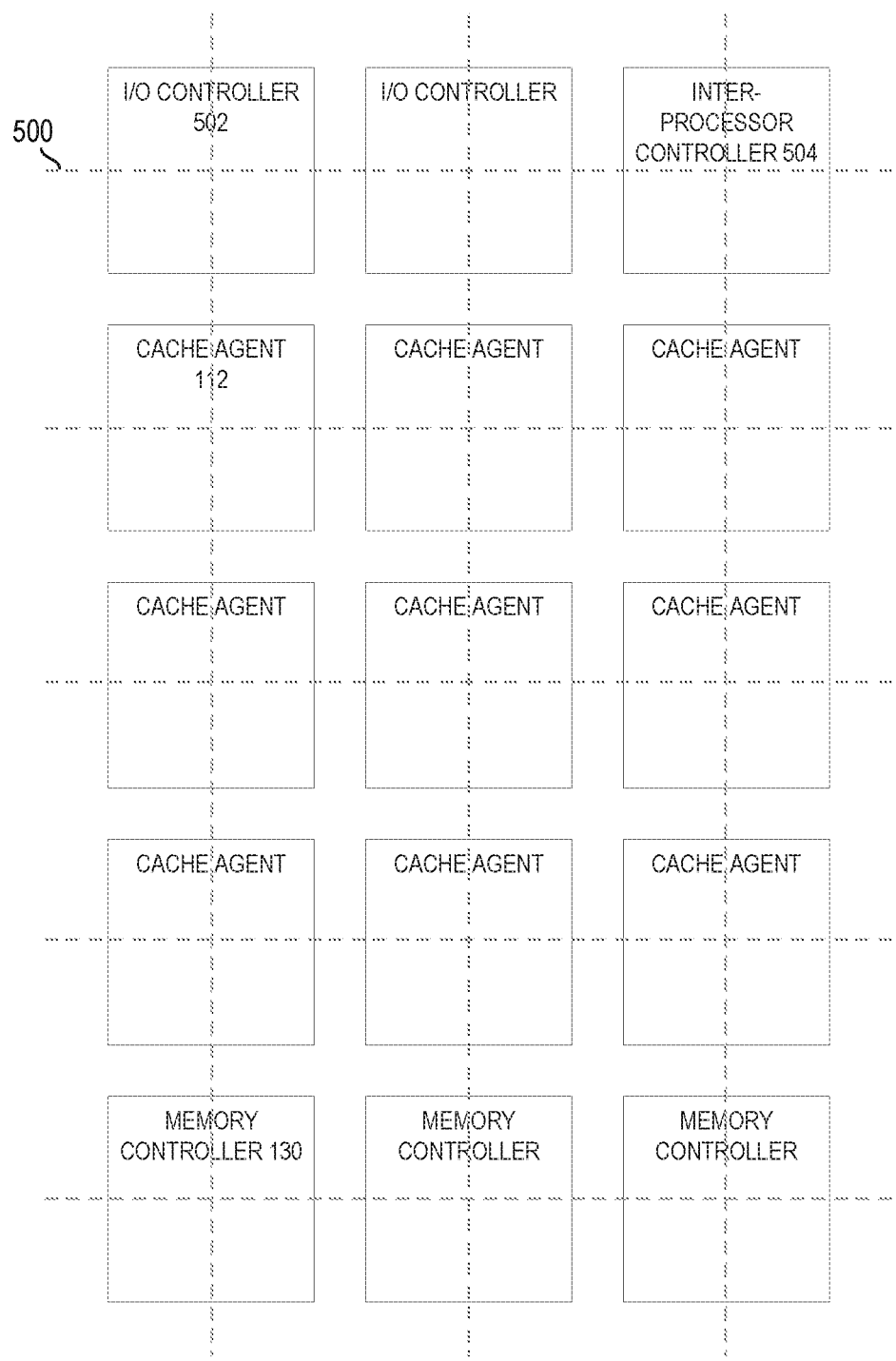
FIG. 5 is an example mesh network comprising cache agents in accordance with certain embodiments.

FIG. 5 is an example mesh network 500 comprising cache agents 112 in accordance with certain embodiments. The mesh network 500 is one example of an interconnect fabric 110 that may be used with various embodiments of the present disclosure. The mesh network 500 may be used to carry requests between the various components (e.g., I/O controllers 124, cache agents 112, memory controllers 130, and inter-processor controller 504). The mesh network may also be used to carry trace writes from the TC engines to one or more memory controllers 130 or I/O controllers 124.

Inter-processor communication controller 504 provides an interface for inter-processor communication. Inter-processor communication controller 504 may couple to an interconnect that provides a transportation path between two or more processors. In various embodiments, the interconnect may be a point-to-point processor interconnect, and the procotol used to communicate over the interconnect may have any suitable characteristics of Intel Ultra Path Interconnect (UPI), Intel QuickPath Interconnect (QPI), or other known or future inter-processor communication protocol. In various embodiments, inter-processor communication controller 504 may be a UPI agent, QPI agent, or similar agent capable of managing inter-processor communications.

Figure 6:
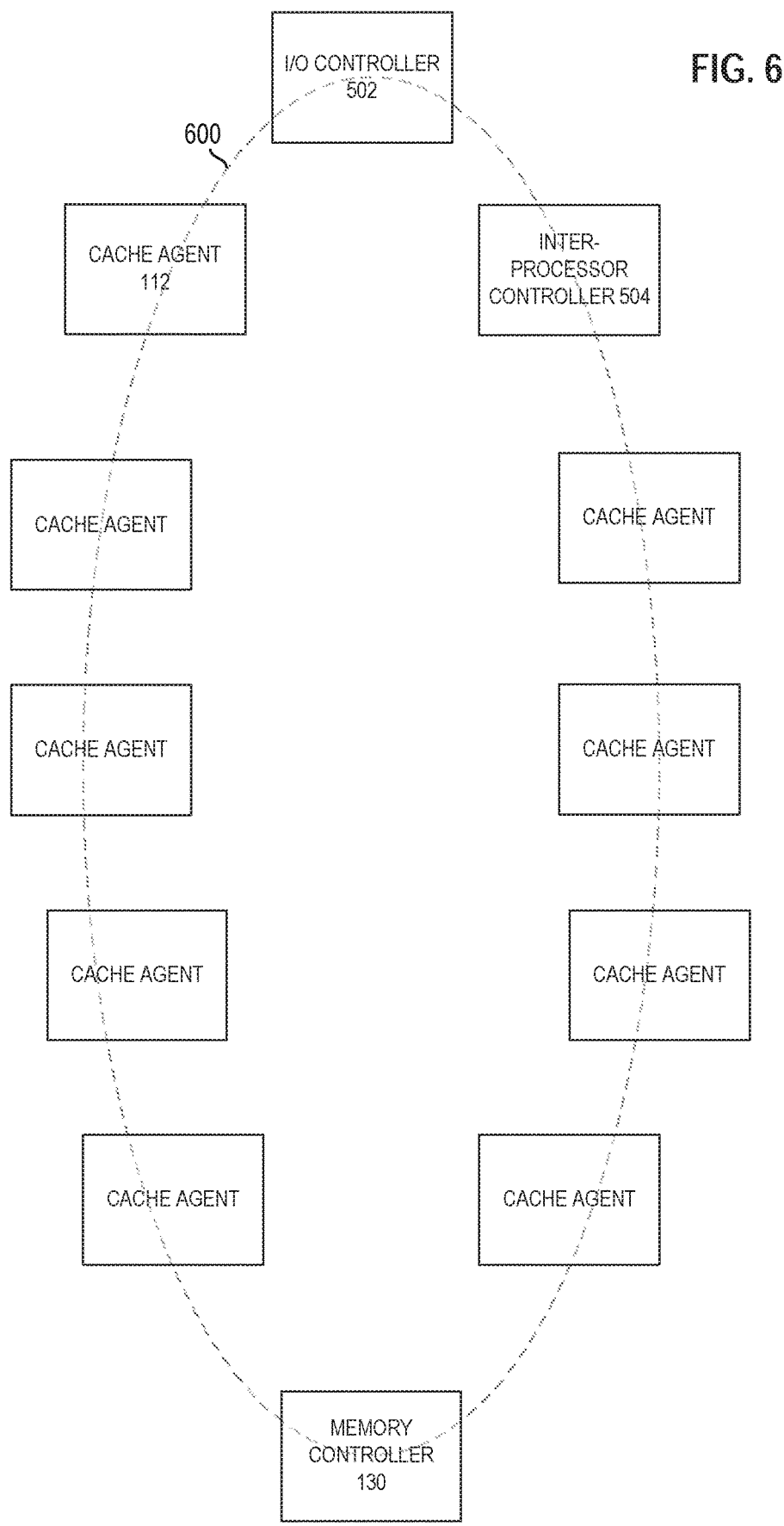
FIG. 6 is an example ring network comprising cache agents in accordance with certain embodiments.

FIG. 6 is an example ring network comprising cache agents 112 in accordance with certain embodiments. The ring network 600 is one example of an interconnect fabric 110 that may be used with various embodiments of the present disclosure. The ring network 600 may be used to carry requests between the various components (e.g., I/O controllers 124, cache agents 112, memory controllers 130, and inter-processor controller 504). The ring network may also be used to carry trace writes from the TC engines 308 to one or more memory controllers 130 or I/O controllers 124.

Figure 7:
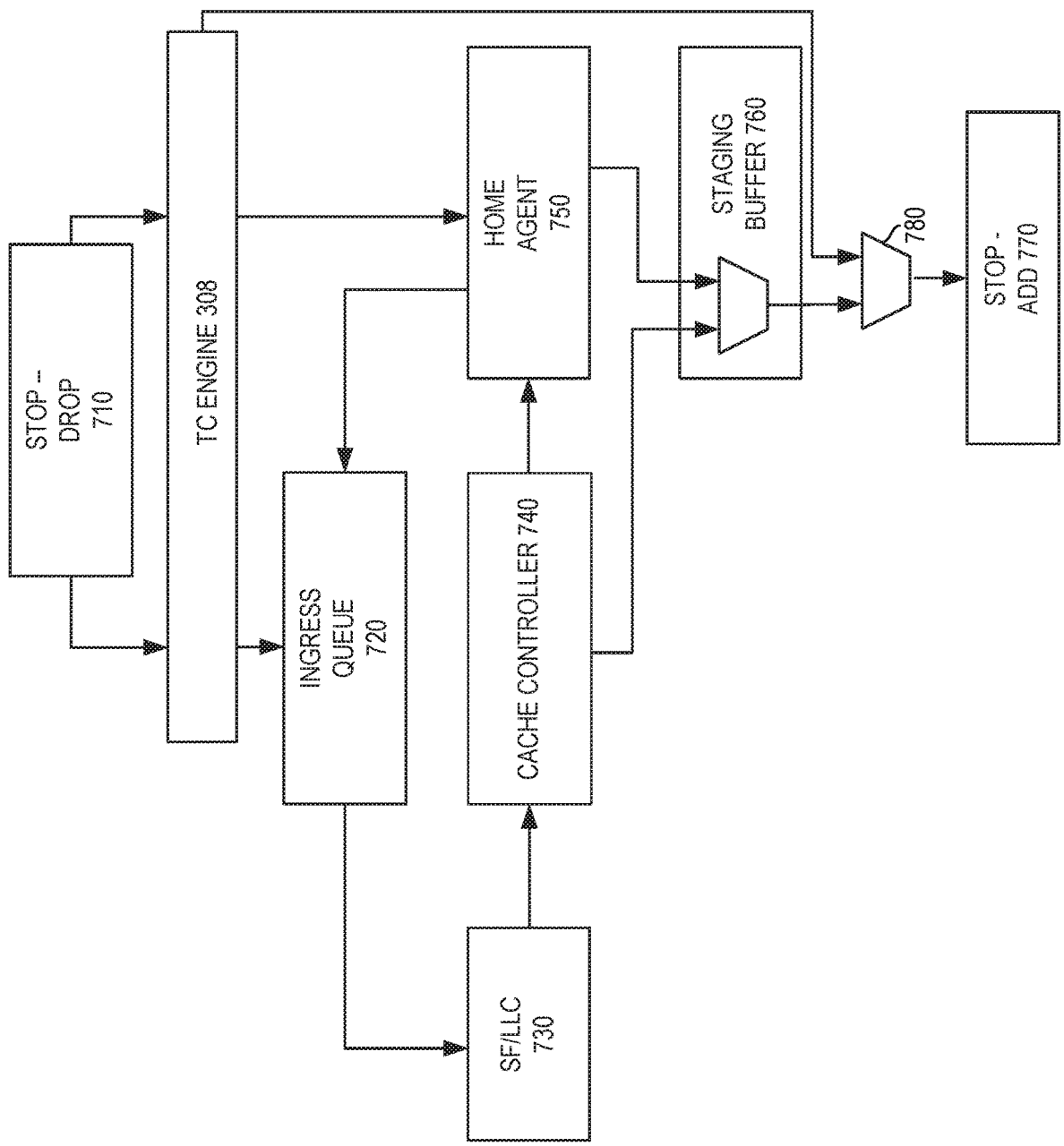
FIG. 7 is a block diagram of a cache agent comprising a TC engine in accordance with certain embodiments.

FIG. 7 is a block diagram of a cache agent 112 comprising a TC engine 308 in accordance with certain embodiments. In the embodiment depicted, cache agent 112 is a CHA, which may be one of many distributed CHAs that collectively form a coherent combined caching home agent for processor 100. In general, the CHA includes various components that couple between interconnect interfaces. Specifically, a first interconnect stop 710 provides inputs from the interconnect fabric 110 to CHA 700 while a second interconnect stop 770 provides outputs from the CHA to interconnect fabric 110. In an embodiment, a processor may include an interconnect fabric such as a mesh interconnect or a ring interconnect such that stops 710 and 770 are configured as mesh stops or ring stops to respectively receive incoming information and to output outgoing information.

As illustrated, first interconnect stop 710 is coupled to an ingress queue 720 that may include one or more entries to receive incoming requests and pass them along to appropriate portions of the CHA. In the implementation shown, ingress queue 720 is coupled to a portion of a cache memory hierarchy, specifically a snoop filter (SF) cache and a last level cache (LLC) 730 (which may be a particular embodiment of cache 114). In general, a snoop filter cache may be a distributed portion of a directory that includes a plurality of entries that store tag information used to determine whether incoming requests hit in a given portion of a cache. In an embodiment, the snoop filter includes entries for a corresponding L2 cache memory to maintain state information associated with the cache lines of the L2 cache. However, the actual data stored in this L2 cache is not present in the snoop filter, as the snoop filter is rather configured to store the state information associated with the cache lines. In turn, LLC 730 may be a slice or other portion of a distributed last level cache and may include a plurality of entries to store tag information, cache coherency information, and data as a set of cache lines. In some embodiments, the snoop filter may be implemented at least in part via a set of entries of the LLC including tag information.

Cache controller 740 may include various logic to perform cache processing operations. In general, cache controller 740 may be configured as a pipelined logic (also referred to herein as a cache pipeline) that further includes a tracker implemented as a table of requests (TOR), which may include various entries to store incoming requests to be processed. The cache controller 740 may perform various processing on memory requests, including various preparatory actions that proceed through a pipelined logic of the caching agent to determine appropriate cache coherency operations. Snoop filter/LLC 730 couples to cache controller 740. Response information may be communicated via this coupling based on whether a lookup request (received from ingress queue 720) hits (or not) in the snoop filter/LLC. In general, cache controller 740 is responsible for local coherency and interfacing with the snoop filter and LLC, and may include one or more trackers each having a plurality of entries to store pending requests.

As further shown, cache controller 740 also couples to a home agent 750 which may include a pipelined logic (also referred to herein as a home agent pipeline) and other structures used to interface with and protect a corresponding portion of a system memory. In general, home agent 750 may include one or more trackers each having a plurality of entries to store pending requests and to enable these requests to be processed through a memory hierarchy. For read requests that miss the snoop filter/LLC, home agent 750 registers the request in a tracker, determines if snoops are to be spawned, and/or memory reads are to be issued based on a number of conditions. In an embodiment, the cache memory pipeline is roughly 9 clock cycles, and the home agent pipeline is roughly 4 clock cycles. This allows the CHA to produce a minimal memory/cache miss latency using an integrated home agent.

Outgoing requests from cache controller 740 and home agent 750 couple through a staging buffer 760 to interconnect stop 770. In an embodiment, staging buffer 760 may include selection logic to select between requests from the two pipeline paths. In an embodiment, cache controller 740 generally may issue remote requests/responses, while home agent 750 may issue memory read/writes and snoops/forwards.

Outgoing requests from the staging buffer 760 and trace writes from the TC engine 308 may be received at an output buffer 780. In an embodiment, output buffer 780 may include selection logic to select between outputs of the staging buffer and trace writes from the TC engine 308.

With the arrangement shown in FIG. 7, first interconnect stop 710 may provide incoming snoop responses or memory responses (e.g., received from off-chip) to home agent 750. Via coupling between home agent 750 and ingress queue 720, home agent completions may be provided to the ingress queue. In addition, to provide for optimized handling of certain memory transactions as described herein (updates such as updates to snoop filter entries), home agent 750 may further be coupled to cache controller 740 via a bypass path, such that information for certain optimized flows can be provided to a point deep in the cache pipeline of cache controller 740. Note also that cache controller 740 may provide information regarding local misses directly to home agent 750. While a particular cache agent architecture is shown in FIG. 7, any suitable cache agent architectures are contemplated in various embodiments of the present disclosure.

The figures below detail exemplary architectures and systems to implement embodiments of the above. In some embodiments, one or more hardware components and/or instructions described above are emulated as detailed below, or implemented as software modules.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression and/or decompression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9B:
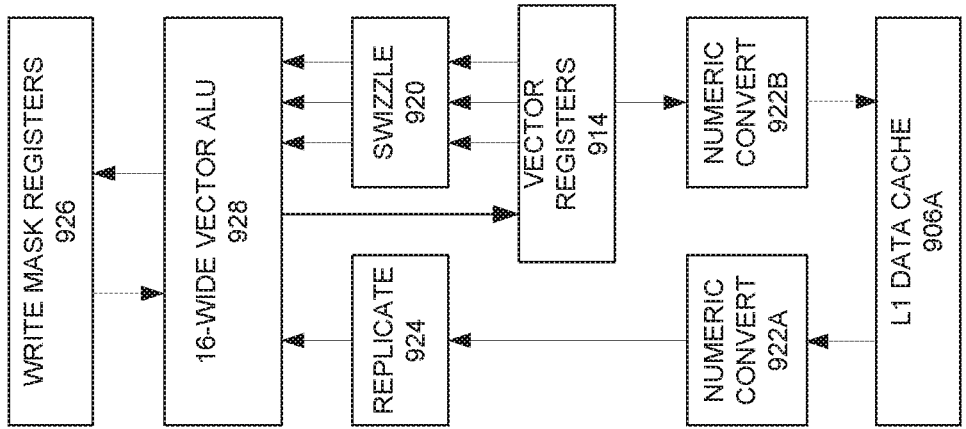
FIGS. 9A-B illustrate a block diagram of a more specific exemplary in-order core architecture, which core would be one of several logic blocks (potentially including other cores of the same type and/or different types) in a chip in accordance with certain embodiments.
Figure 9A:
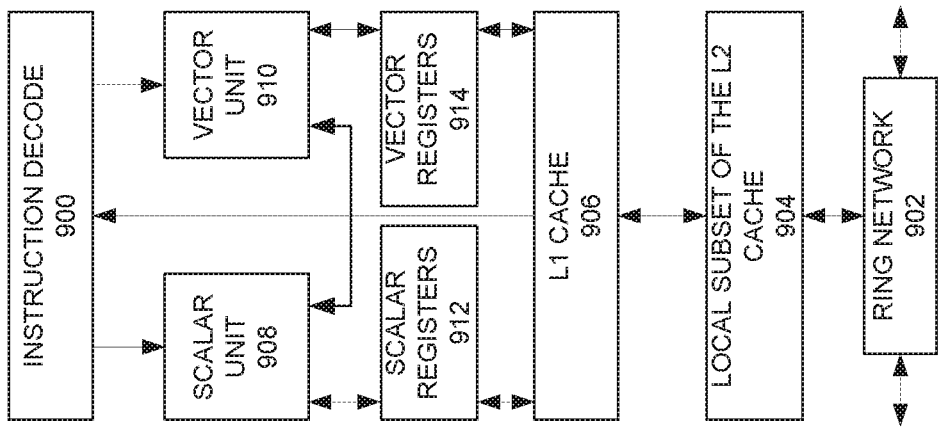

FIGS. 9A-B illustrate a block diagram of a more specific exemplary in-order core architecture, which core would be one of several logic blocks (potentially including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to various embodiments. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments may use a different approach (e.g., use a single register set or include a communication path that allow data to be transferred between the two register files without being written and read back).

The local subset of the L2 cache 904 is part of a global L2 cache that is divided into separate local subsets (in some embodiments one per processor core). Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. In a particular embodiment, each ring data-path is 1012-bits wide per direction.

FIG. 9B is an expanded view of part of the processor core in FIG. 9A according to embodiments. FIG. 9B includes an L1 data cache 906A (part of the L1 cache 906), as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
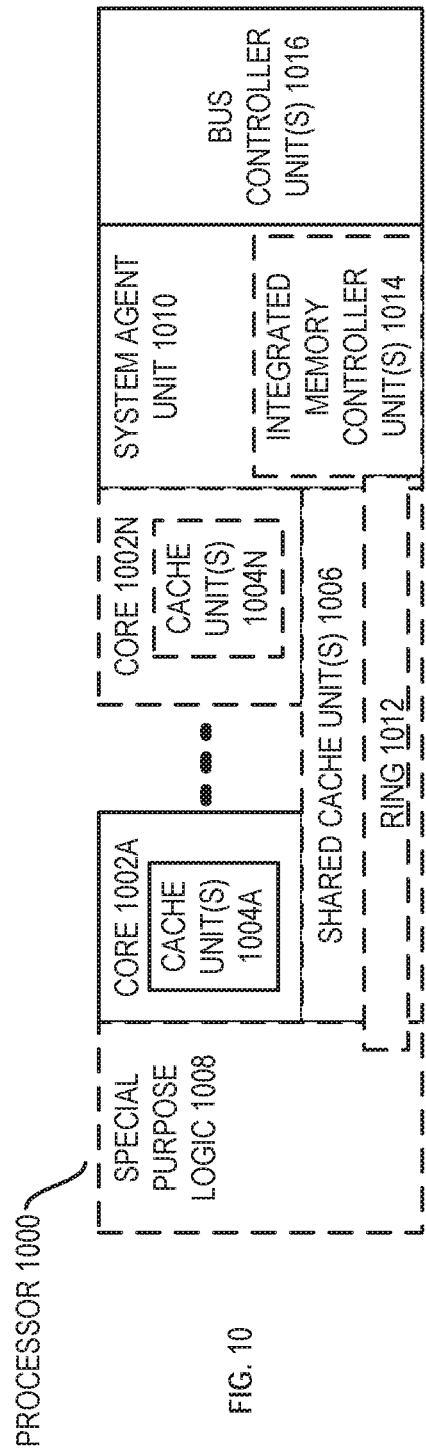
FIG. 10 is a block diagram of a processor that may have more than one core, may have an integrated memory controller, and may have integrated graphics in accordance with certain embodiments.

FIG. 10 is a block diagram of a processor 1000 that may have more than one core, may have an integrated memory controller, and may have integrated graphics according to various embodiments. The solid lined boxes in FIG. 10 illustrate a processor 1000 with a single core 1002A, a system agent 1010, and a set of one or more bus controller units 1016; while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, or a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 1000 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the special purpose logic (e.g., integrated graphics logic) 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the special purpose logic 1008. The display unit is for driving one or more externally connected displays.

The cores 1002A-N may be homogenous or heterogeneous in terms of architecture instruction set; that is, two or more of the cores 1002A-N may be capable of executing the same instruction set, while others may be capable of executing only a subset of that instruction set or a different instruction set.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 11:
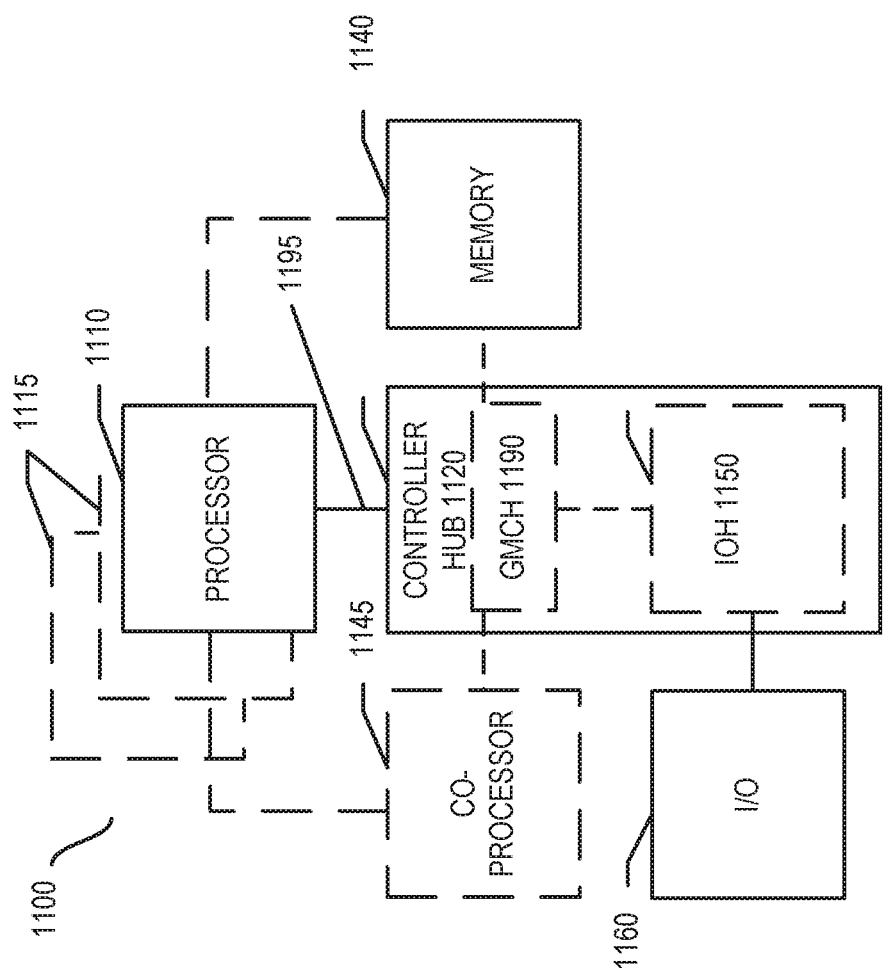
FIGS. 11, 12, 13, and 14 are block diagrams of exemplary computer architectures in accordance with certain embodiments.

FIG. 11 depicts a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips or the same chip); the GMCH 1190 includes memory and graphics controllers coupled to memory 1140 and a coprocessor 1145; the IOH 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 is a single chip comprising the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), other suitable memory, or any combination thereof. The memory 1140 may store any suitable data, such as data used by processors 1110, 1115 to provide the functionality of computer system 1100. For example, data associated with programs that are executed or files accessed by processors 1110, 1115 may be stored in memory 1140. In various embodiments, memory 1140 may store data and/or sequences of instructions that are used or executed by processors 1110, 1115.

In at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression and/or decompression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
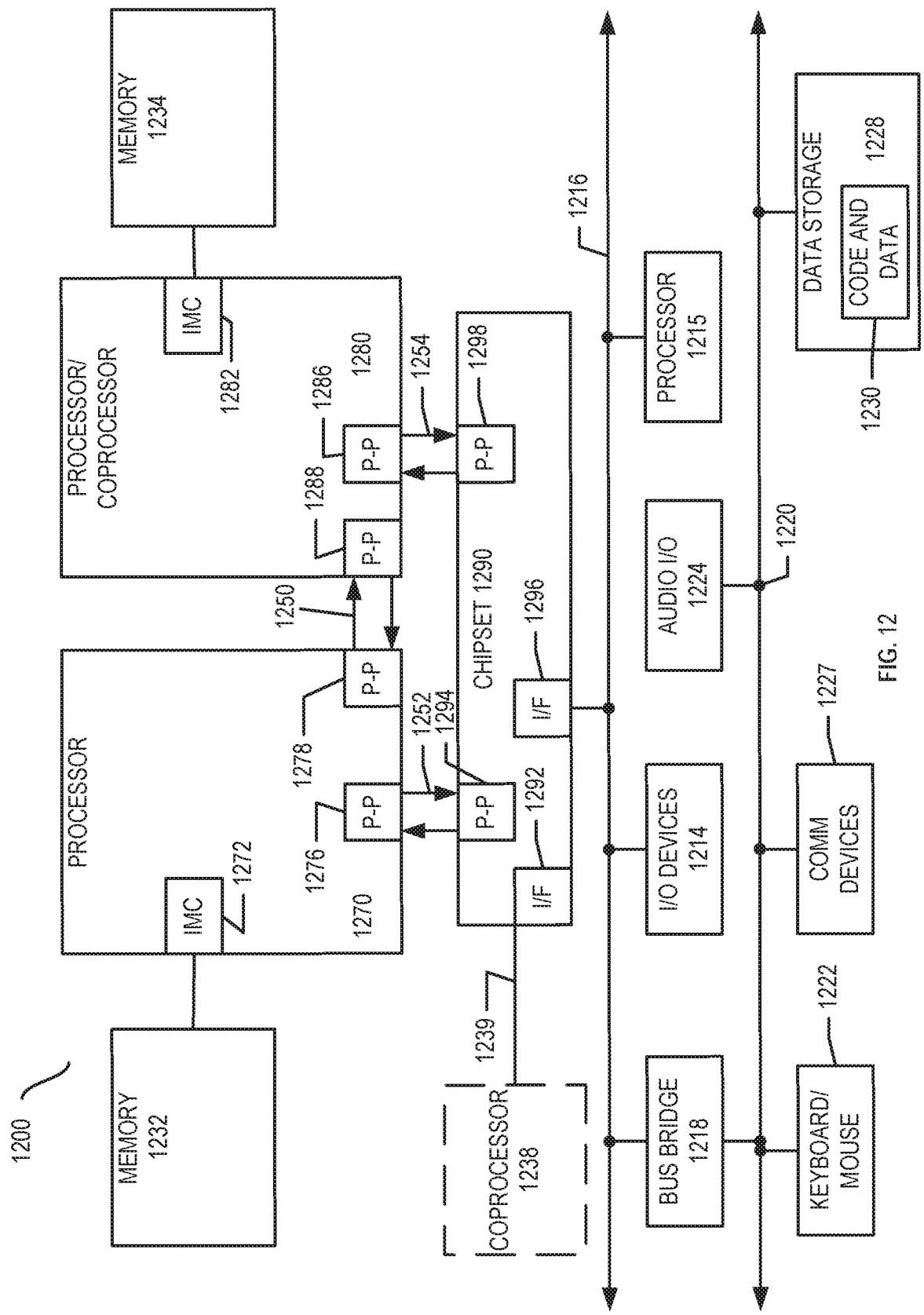

FIG. 12 depicts a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 and coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are contemplated by this disclosure. For example, instead of the point-to-point architecture of FIG. 12, a system may implement a multi-drop bus or other such architecture.

Figure 13:
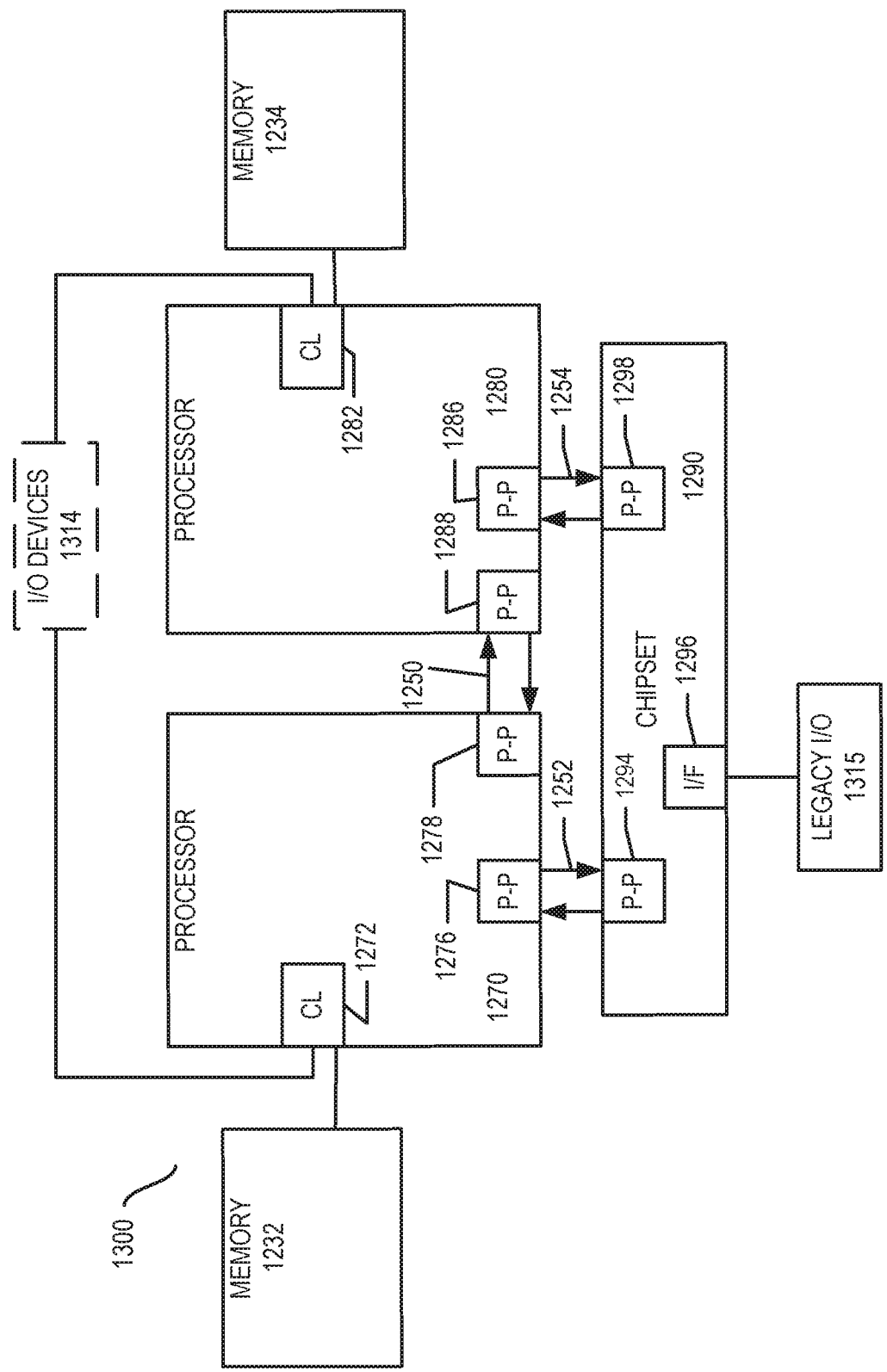

FIG. 13 depicts a block diagram of a second more specific exemplary system 1300 in accordance with an embodiment of the present disclosure. Similar elements in FIGS. 12 and 13 bear similar reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
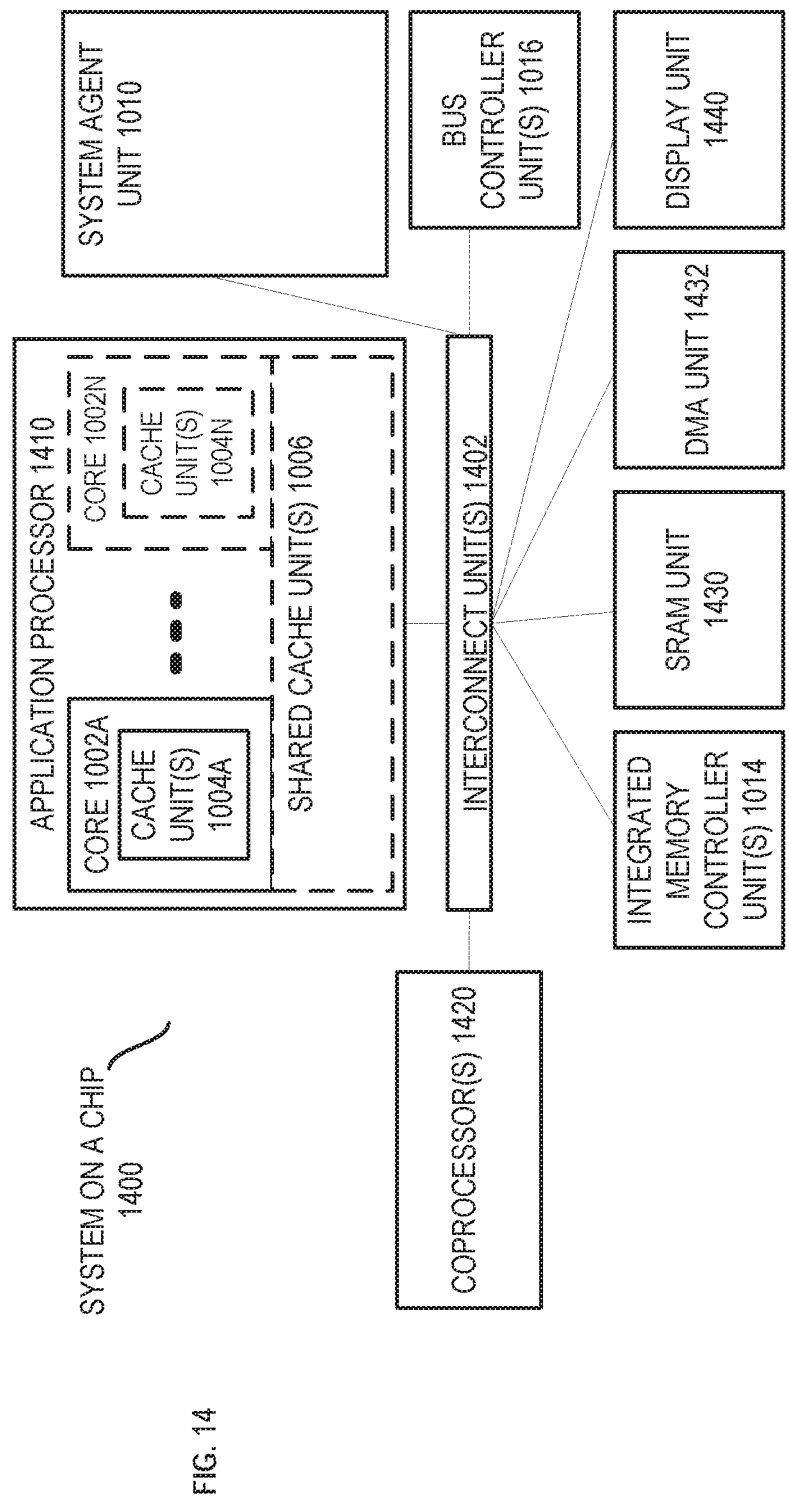

FIG. 14 depicts a block diagram of a SoC 1400 in accordance with an embodiment of the present disclosure. Similar elements in FIG. 10 bear similar reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
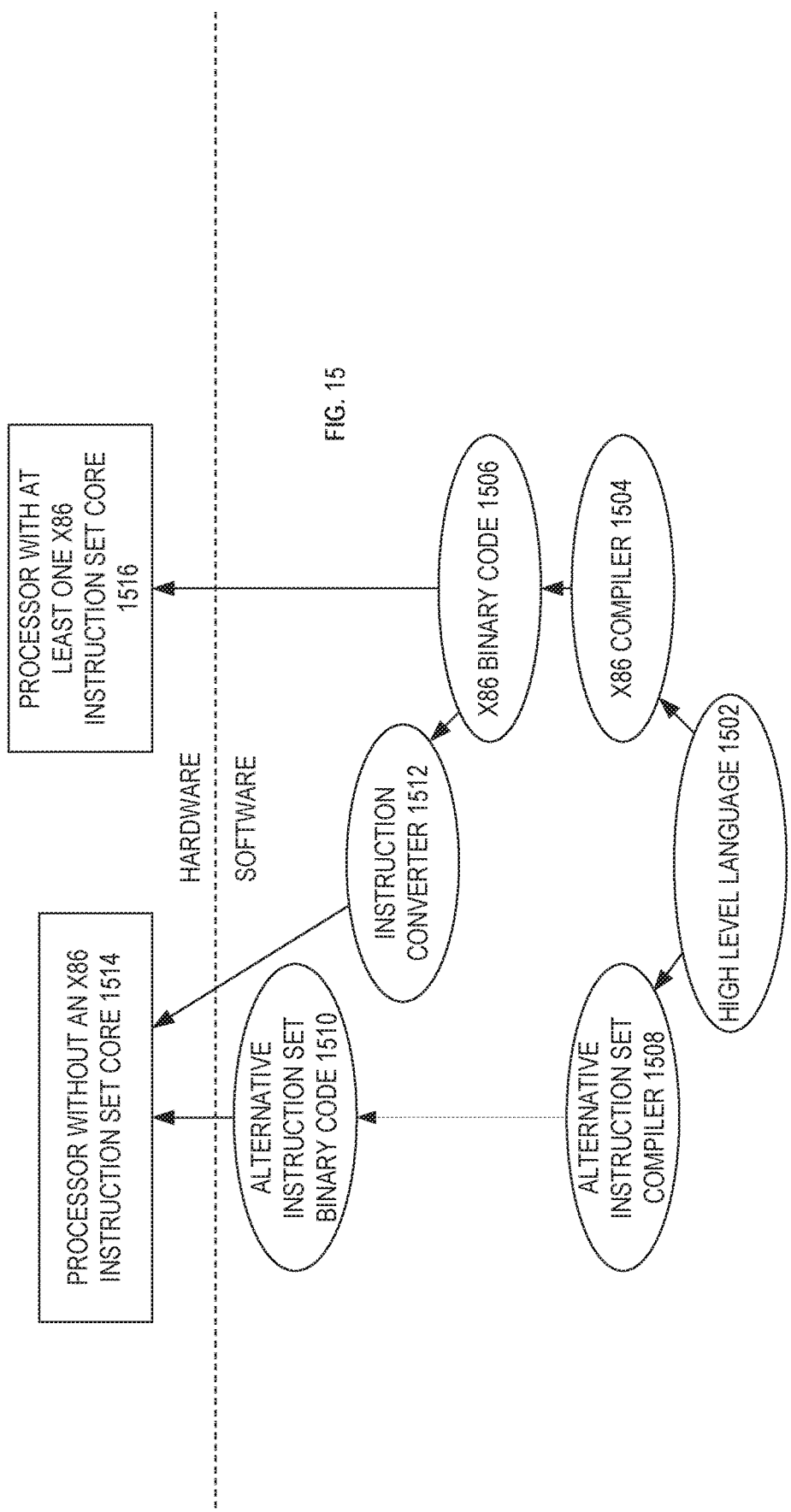
FIG. 15 is a block diagram contrasting the use of a software instruction converter to convert binary instructions in a source instruction set to binary instructions in a target instruction set in accordance with certain embodiments.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components such as processor 100, cores 102, interconnect fabric 110, cache agents 112, caches 114, I/O controller 124, memory controller 130, system memory 134, I/O devices 126, TC engine 308, other component described herein, or any subcomponent of any of these components. "Logic" may refer to hardware, firmware, software and/or combinations of each to perform one or more functions. As an example, logic may include hardware, such as a microcontroller or processor, associated with a non-transitory medium to store code adapted to be executed by the microcontroller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a system comprises a processor comprising a fabric interconnect to couple a first cache agent to at least one of a memory controller or an input/output (I/O) controller; and the first cache agent comprising a cache controller coupled to a cache; and a trace and capture engine to periodically capture a snapshot of state information associated with the first cache agent; trace events to occur at the first cache agent in between captured snapshots; and send the captured snapshots and traced events via the fabric interconnect to the memory controller or I/O controller for storage at a system memory or storage device.

In an embodiment, the system further comprises an emulator comprising logic corresponding to the first cache agent and cache, the emulator to load a snapshot captured by the trace and capture engine, replay the traced events, and provide state information of the logic corresponding to the first cache agent for debugging of the processor. In an embodiment, the emulator is to load the snapshot in response to receiving an indication of a subset of one or more cache agents that experienced a failure, wherein the first cache agent is included in the indication of the subset. In an embodiment, each of a plurality of cache agents of the processor comprise a respective trace and capture engine, and each trace and capture engine is to periodically capture a snapshot of state information associated with its respective cache agent; trace events to occur at its respective cache agent in between captured snapshots; and send the captured snapshots and traced events via the fabric interconnect to the memory controller or I/O controller for storage at a system memory or storage device. In an embodiment, the trace and capture engine is to determine that bandwidth of the fabric interconnect is not high enough to sustain lossless transfer of the traced events; throttle incoming requests for the first cache agent; and send traced events via the fabric interconnect during a period of time in which the incoming requests are throttled. In an embodiment, the trace and capture engine is to throttle incoming requests for the first cache agent by throttling at least one buffer, wherein the first cache agent is also to throttle the at least one buffer in response to a determination that bandwidth for processing incoming requests by the first cache agent is constrained. In an embodiment, the trace and capture engine is to capture a snapshot of state information associated with the first cache agent in response to receiving a periodic trigger from a counter of the processor. In an embodiment, the trace and capture engine is to capture a snapshot of state information associated with the first cache agent in response to the processor quiescing requests to the first cache agent. In an embodiment, the snapshot of state information associated with the first cache agent includes contents of the cache. In an embodiment, the snapshot of state information associated with the first cache agent includes contents of a snoop filter cache. In an embodiment, the events to occur at the first cache agent in between captured snapshots include writes to and reads from the cache. In an embodiment, the events to occur at the first cache agent in between captured snapshots include snoop operations.

In at least one embodiment, a method comprises periodically capturing, by a trace and capture engine, a snapshot of state information associated with a first cache agent of a processor, the first cache agent coupled to a cache, the first cache agent coupled to at least one of a memory controller or an input/output (I/O) controller via a fabric interconnect; tracing, by the trace and capture engine, events occurring at the first cache agent in between captured snapshots; and sending the captured snapshots and traced events via the fabric interconnect to the memory controller or I/O controller for storage at a system memory or storage device.

In an embodiment, the method further comprises loading a snapshot captured by the trace and capture engine into an emulator comprising logic corresponding to the first cache agent and cache, replaying the traced events at the emulator, and providing state information of the logic corresponding to the first cache agent for debugging of the processor. In an embodiment, the method further comprises loading the snapshot captured by the trace and capture engine into the emulator in response to receiving an indication of a subset of one or more cache agents that experienced a failure, wherein the first cache agent is included in the indication of the subset. In an embodiment, each of a plurality of cache agents of the processor comprise a respective trace and capture engine, and the method further comprises periodically capturing a snapshot of state information associated with its respective cache agent; tracing events occurring at its respective cache agent in between captured snapshots; and sending the captured snapshots and traced events via the fabric interconnect to the memory controller or I/O controller for storage at a system memory or storage device. In an embodiment, the method further comprises determining that bandwidth of the fabric interconnect is not high enough to sustain lossless transfer of the traced events; throttling incoming requests for the first cache agent; and sending traced events via the fabric interconnect during a period of time in which the incoming requests are throttled. In an embodiment, the method further comprises throttling incoming requests for the first cache agent by throttling at least one buffer, wherein the first cache agent is also to throttle the at least one buffer in response to a determination that bandwidth for processing incoming requests by the first cache agent is constrained. In an embodiment, the method further comprises capturing a snapshot of state information associated with the first cache agent in response to receiving a periodic trigger from a counter of the processor. In an embodiment, the method further comprises capturing a snapshot of state information associated with the first cache agent in response to the processor quiescing requests to the first cache agent. In an embodiment, the snapshot of state information associated with the first cache agent includes contents of the cache. In an embodiment, the snapshot of state information associated with the first cache agent includes contents of a snoop filter cache. In an embodiment, the events occurring at the first cache agent in between captured snapshots include writes to and reads from the cache. In an embodiment, the events occurring at the first cache agent in between captured snapshots include snoop operations.

In at least one embodiment, at least one machine readable storage medium has instructions stored thereon, the instructions when executed by a machine to cause the machine to periodically capture, by a trace and capture engine, a snapshot of state information associated with a first cache agent of a processor, the first cache agent coupled to a cache, the first cache agent coupled to at least one of a memory controller or an input/output (I/O) controller via a fabric interconnect; trace, by the trace and capture engine, events to occur at the first cache agent in between captured snapshots; and send the captured snapshots and traced events via the fabric interconnect to the memory controller or I/O controller for storage at a system memory or storage device.

In an embodiment, the instructions when executed are to cause the machine to load a snapshot captured by the trace and capture engine into an emulator comprising logic corresponding to the first cache agent and cache, replay the traced events at the emulator, and provide state information of the logic corresponding to the first cache agent for debugging of the processor. In an embodiment, the instructions when executed are to cause the machine to load the snapshot captured by the trace and capture engine into the emulator in response to receiving an indication of a subset of one or more cache agents that experienced a failure, wherein the first cache agent is included in the indication of the subset. In an embodiment, the snapshot of state information associated with the first cache agent includes contents of the cache.

In at least one embodiment, a system comprises means for periodically capturing, by a trace and capture engine, a snapshot of state information associated with a first cache agent of a processor, the first cache agent coupled to a cache, the first cache agent coupled to at least one of a memory controller or an input/output (I/O) controller via a fabric interconnect; means for tracing, by the trace and capture engine, events to occur at the first cache agent in between captured snapshots; and means for sending the captured snapshots and traced events via the fabric interconnect to the memory controller or I/O controller for storage at a system memory or storage device.

In an embodiment, the system further comprises means for loading a snapshot captured by the trace and capture engine into an emulator comprising logic corresponding to the first cache agent and cache, replaying the traced events at the emulator, and providing state information of the logic corresponding to the first cache agent for debugging of the processor. In an embodiment, the system further comprises means for further comprising loading the snapshot captured by the trace and capture engine into the emulator in response to receiving an indication of a subset of one or more cache agents that experienced a failure, wherein the first cache agent is included in the indication of the subset. In an embodiment, the snapshot of state information associated with the first cache agent includes contents of the cache. In an embodiment, the snapshot of state information associated with the first cache agent includes contents of a snoop filter cache.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
  a processor comprising:
    a fabric interconnect to couple a first cache agent to at least one of a memory controller or an input/output (I/O) controller; and
    the first cache agent
      to:
        periodically capture a snapshot of state information associated with the first cache agent;
        trace events to occur at the first cache agent in between captured snapshots; and
        send the captured snapshots and traced events via the fabric interconnect to the memory controller or I/O controller for storage at a system memory or storage device.

2. The system of claim 1, further comprising an emulator to load a snapshot captured by the first cache agent, replay the traced events, and provide state information of the emulator for debugging of the processor.

3. The system of claim 2, wherein the emulator is to load the snapshot in response to receiving an indication of a subset of one or more cache agents that experienced a failure, wherein the first cache agent is included in the indication of the subset.

4. The system of claim 1, wherein each of a plurality of cache agents of the processor comprise a respective trace and capture engine, each trace and capture engine to:
  periodically capture a snapshot of state information associated with its respective cache agent;
  trace events to occur at its respective cache agent in between captured snapshots; and
  send the captured snapshots and traced events via the fabric interconnect to the memory controller or I/O controller for storage at a system memory or storage device.

5. The system of claim 1, wherein the first cache agent is to:
  determine that bandwidth of the fabric interconnect is not high enough to sustain lossless transfer of the traced events;
  throttle incoming requests for the first cache agent; and
  send traced events via the fabric interconnect during a period of time in which the incoming requests are throttled.

6. The system of claim 5, wherein the first cache agent is to throttle incoming requests for the first cache agent by throttling at least one buffer, wherein the first cache agent is also to throttle the at least one buffer in response to a determination that bandwidth for processing incoming requests by the first cache agent is constrained.

7. The system of claim 1, wherein the first cache agent is to capture a snapshot of state information associated with the first cache agent in response to receiving a periodic trigger from a counter of the processor.

8. The system of claim 1, wherein the first cache agent is to capture a snapshot of state information associated with the first cache agent in response to the processor quiescing requests to the first cache agent.

9. The system of claim 1, wherein the snapshot of state information associated with the first cache agent includes contents of a cache.

10. The system of claim 1, wherein the snapshot of state information associated with the first cache agent includes contents of a snoop filter cache.

11. The system of claim 1, wherein the events to occur at the first cache agent in between captured snapshots include writes to and reads from a cache.

12. The system of claim 1, wherein the events to occur at the first cache agent in between captured snapshots include snoop operations.

* * * * *